Patented Dec. 9, 1941

2,265,777

UNITED STATES PATENT OFFICE 2,265,777

RUBBER DISPERSION

James A. Merrill, Akron, Ohio, assignor to Wingfoot Corporation, Wilmington, Del., a corporation of Delaware No Drawing. Application April 4, 1939, Serial No. 265,929

4 Claims. (Cl. 260—760)

This invention relates to dispersions of rubber and methods of preparing the same. More particularly, it relates to dispersions of rubber in media normally having a coagulating effect on rubber.

Rubber is available in a variety of dispersed forms. For example, rubber latex is a naturally occurring dispersion of rubber particles in an aqueous medium. Also, there are various processes for preparing artificial latices by dispersing solid rubber in water. However, when natural latex is mixed with certain liquids such as alcohol, acetone, etc., the rubber in the latex ordinarily is coagulated and separates from the dispersion as a solid mass. This characteristic renders it difficult to prepare dispersions of rubber in these coagulating liquids.

According to the present invention, a method has been discovered whereby dispersons of rubber may be formed in media which ordinarily cause coagulation of the rubber. For example, a rubber dispersion similar to latex may be prepared in alcohol or acetone. Similarly, rubber may be dispersed in acid media, such as sulfuric acid, which would normally coagulate the rubber.

Broadly, the process of the invention consists in flocculating rubber from rubber latex and progressively replacing the latex serum with a rubber non-solvent which is miscible with water and which normally has a coagulating effect on the rubber latex. The following examples illustrate the practice of the invention.

Example 1

To 270 cc. of 40% latex diluted with 250 cc. of water were added, with stirring, 10 grams of 10% casein solution, 67 cc. of 2% hydrochloric acid and 96 cc. of 1% sodium stearate. This mixture was then poured into 1330 cc. of 0.5% zinc sulfate solution, with agitation, to form a fine slurry of flocculated rubber which was filtered to remove a large part of the liquid and yield a firm filter cake in which, however, there was no cohesion of the rubber particles. This filter cake was then broken up and dispersed in 800 cc. of ethyl alcohol by stirring. The resulting slurry was filtered to yield a filter cake similar to that previously obtained and this filter cake was then dispersed in enough alcohol to bring the total weight to 667 grams. The product thus obtained was a dispersion of rubber in approximately 90% alcohol, the dispersion containing 15% solids.

Example 2

A mixture of 270 cc. of 40% latex and 20 grams of 10% casein solution was diluted with 250 cc. of water and poured into 600 cc. of water containing 10 grams of 34% aluminum chloride. The resulting slurry was partially dehydrated by filtering to obtain a firm but crumbly filter cake. This filter cake was then washed on the filter with the amount of ethyl alcohol theoretically required to displace the water remaining in the mass, leaving the cake moist with alcohol. The cake was then removed from the filter and dispersed in 800 grams of alcohol by using a high speed agitator. The resulting product was a 10% dispersion of fine floccular rubber in approximately 90% alcohol.

By repeating the filtration and washing in Example 1 or by additional washing in Example 2, the water can be almost entirely replaced by the alcohol to obtain dispersions in substantially pure alcohol instead of the 90% alcohol of the examples.

Also, by substituting acetone or other rubber non-solvents normally having a coagulating effect on rubber latex for the alcohol of the examples, dispersions in these other media may be similarly obtained. Further representative examples of such media, which may be either organic liquids, solutions in water or other solvents, or mixtures of these, are sulfuric acid, hydrochloric acid, acetic acid, methyl alcohol, acetone, methyl ethyl ketone, isopropyl alcohol, etc.

Various other flocculating agents may also be substituted for those used in the examples such as, for example, the chlorides and sulfates of aluminum, zinc, iron, etc., and other acidic salts having a flocculating action on latex.

Likewise, other hydrophillic colloids than the casein of the examples may be employed. Other representative materials are sodium silicate, haemoglobin, etc., these materials generally exerting a profound influence on the particle size of the flocs obtained. It is also possible to practice the invention in the absence of any such added hydrophillic colloids.

Various latices may be used in the practice of the invention, including raw latex and latex preserved with ammonia, sodium hydroxide, potassium hydroxide, formaldehyde, etc. Also, the latex may vary in concentration, the concentration during the flocculating step having considerable influence on the size of the flocs obtained.

If desired, the dewatering of the cake and replacement of the water with the other dispersing medium may be effected continuously by the use of a continuous filter, such as the drum and the leaf filters available on the market, by continuously filtering the flocculated latex with such apparatus and washing the partially dehydrated cake on the filter. The washed cake is then dispersed in a manner similar to the examples.

In the practice of the invention, it is desirable in order to prevent coagulation of the rubber to keep the mix neutral or acid after the flocculation step, i. e., at a pH not greater than 7.

While there has been described above a preferred embodiment of the invention, it will be understood that no limitation is to be inferred therefrom, the invention being limited only by the appended claims in which it is intended to set forth all features of patentable novelty residing therein.

What I claim is:

1. A method of dispersing rubber in a rubber non-solvent normally having a coagulative effect on natural rubber latex and miscible with water which comprises flocculating natural rubber latex by the addition thereto of an acidic salt and progressively replacing the latex serum with the non-solvent.

2. A method of dispersing rubber in alcohol which comprises flocculating natural rubber latex by the addition thereto of an acidic salt and progressively replacing the latex serum with ethyl alcohol.

3. A method of dispersing rubber in a non-aqueous rubber non-solvent miscible with water and normally having a coagulative effect on natural rubber latex which comprises flocculating natural rubber latex by the addition thereto of an acidic salt, forming a partially dehydrated non-coherent cake of the flocculated rubber, and dispersing the cake in the non-solvent.

4. A method of dispersing rubber in a rubber non-solvent normally having a coagulative effect on natural rubber latex and miscible with water which comprises flocculating natural rubber latex by the addition thereto of an acidic salt and progressively replacing the latex serum with the non-solvent while maintaining the mixture at a pH not greater than 7.

JAMES A. MERRILL.